G. W. BAKER.
EYEGLASSES AND THE LIKE.
APPLICATION FILED NOV. 3, 1910.

1,085,522.

Patented Jan. 27, 1914.

Witnesses:

Inventor
George W. Baker
by
Attorney

UNITED STATES PATENT OFFICE.

GEORGE WISTON BAKER, OF WOLLSTONECRAFT, NORTH SYDNEY, NEW SOUTH WALES, AUSTRALIA.

EYEGLASSES AND THE LIKE.

1,085,522.   Specification of Letters Patent.   Patented Jan. 27, 1914.

Application filed November 3, 1910. Serial No. 590,489.

*To all whom it may concern:*

Be it known that I, GEORGE WISTON BAKER, a subject of the King of Great Britain, residing at "Enuk," Milner's Crescent, Wollstonecraft, North Sydney, in the State of New South Wales, Commonwealth of Australia, have invented new and useful Improvements in Eyeglasses and the like, of which the following is a specification.

Users of bi-focal eye glasses, in which the lenses have been fixed in the spectacles or like frame, have been under considerable disadvantages because the auxiliary power or close vision segments or sectors of the lenses, although conveniently placed for reading and similar purposes, have been an impediment to the wearer's vision when walking for instance, because they prevent a clear and continuous view of the ground.

To obviate the above disadvantages, it has been previously proposed to construct bi-focal eye glasses having the lenses adapted to be turned so as to reverse the positions of the lens segments for near and distant vision, but in most cases the bi-focal lenses have been either mounted so that they must be necessarily turned together or placed in secondary frames swiveling on the main frame of spectacles.

This invention relates to the kind of glasses termed pince-nez and having bi-focal lenses, and it consists in improvements the main object of which is to obviate the use of the secondary or auxiliary frame while allowing each lens to be revolved separately and independently of the other. The lenses are mounted upon a frame in such a way that each can be rotated or moved so as to bring either the high or lower power segments or portions of the lenses, for close or distant vision, into the field of vision, or so that said lenses will focus in a desired direction.

In order that the invention may be readily understood, it will be described by reference to the accompanying drawings, in which—

Figure 1:
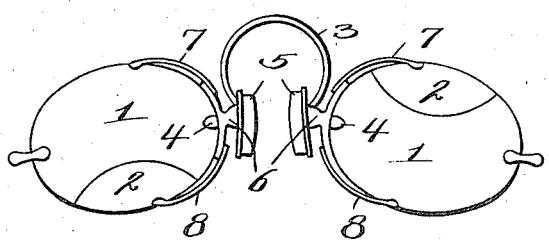
Figure 2:
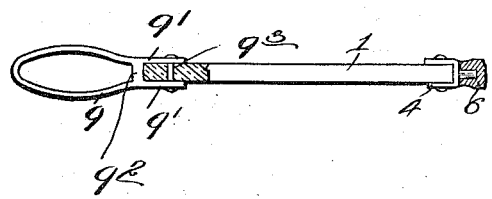
Figure 3:
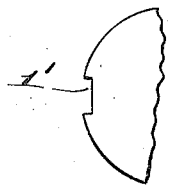

Figure 1 represents in elevation a pair of pince-nez of bi-focal character; Fig. 2 is a section through part of a lens with a device for rotating the lens attached, and Fig. 3 is an elevation of a notched part of the lens indicated in Fig. 2.

The same reference numerals indicate corresponding parts in all the figures.

In the drawings, 1 and 2 represent the two segments of a bi-focal lens. A bridge or nose piece 3, a pair of nose grasping members 5 and the suitably constructed parts 6 constitute the frame of the eye glasses or spectacles.

The lenses are each attached to a trunnion 4, and the two trunnions work in suitable bearings in the parts 6 of the frame. The lenses can thus be turned through any desired or convenient angle and retained at such angle by friction in the trunnion bearings so that they will focus downwardly and thus minimize the necessity for bending the head forward to such an extent as would be required where ordinary fixed bi-focal lenses are used; or the lenses may be turned completely over or reversed, as indicated in Fig. 1 so as to bring the close vision segment, or auxiliary segment, into either its lowered position, as indicated on the one side, or turned up out of the way by reversing the lens as indicated on the other side, in which case when the movement has been completed the whole of the lower part of the lens will offer a clear field of vision from the ground upward to a sufficient height for all ordinary walking purposes.

The lens on the right hand side of the eye glasses, that is on the left of Fig. 1, is illustrated in the position it would occupy with the close vision segment or auxiliary lens, 2, in its lower position, that is convenient for reading or close vision purposes. When in this position, this segment interferes with the vision by preventing a clear view of the ground or floor from being obtained. By, however, turning it over into the position indicated on the left hand side of the eye glasses that is, on the right of Fig. 1, a clear field of vision is at once afforded through the low power or distant vision segment 1 and consequently the eye glasses or spectacles can be used with perfect comfort and safety for walking about.

To facilitate the rotation or semi-rotation of these bi-focal lenses, a small projection or clip 9 is formed or fitted upon some convenient part of each lens near the periphery thereof. The clip may comprise two oppositely disposed parts 9′ and a transverse part $9^2$ adapted to fit a notch 1′ formed in the periphery of a lens, and to be suitably secured to the lens as for instance by the rivet $9^3$.

Means are provided for retaining the lenses in either of the reversed positions indicated on the right and left of Fig. 1. Such means may consist of one or more spring members for each lens, the spring members 7, 8 being mounted or attached to the parts 6 and formed to clip over the edges of the lenses and to retain them in one or another of the extreme positions. These clip members also afford support to the lenses.

It will be obvious that the construction of the glasses illustrated can be modified in various details without departing from the essential feature of the invention.

Having thus described my invention and the best means I know of carrying the same into practical effect, I claim:—

1. In combination with a pince-nez spectacle frame, a bridge piece and nose grasping members, a plurality of lenses each having sections with different foci, a single trunnion attached to each lens and adapted to turn in corresponding bearings in the frame, whereby each lens may be independently turned about an axis passing longitudinally through the corresponding trunnion into different adjusted positions and means mounted on parts of the frame adjacent to the nose grasping members, adapted to retain the lenses in certain of said positions.

2. In combination with a pince-nez spectacle frame, a bridge piece and nose grasping members, a plurality of lenses each having sections with different foci, a single trunnion attached to each lens and adapted to turn in corresponding bearings in the frame, whereby each lens may be independently turned about an axis passing longitudinally through the corresponding trunnion into different adjusted positions, means comprising a projection carried by each lens for turning the lenses about their respective axes, and means mounted on parts of the frame adjacent to the nose grasping members, adapted to retain the lenses in certain of said positions.

3. In combination with a pince-nez spectacle frame, a bridge piece and nose grasping members, a plurality of lenses each having sections with different foci, a single trunnion attached to each lens and adapted to turn in corresponding bearings in the frame, whereby each lens may be independently turned about an axis passing longitudinally through the corresponding trunnion into different adjusted positions, and spring members mounted on the frame adjacent to the nose grasping members each adapted to grip a lens and thereby retain it in certain of said positions.

In testimony whereof I have hereunto set my hand in the presence of two subscribing witnesses.

GEORGE WISTON BAKER.

Witnesses:
JOSEPHENE LOUISE IMRAY,
RAYMOND BRACKLEY STRANGE.